3,030,313
PROCESS FOR MAKING THALLIUM ACTIVATED POTASSIUM IODIDE PHOSPHOR
Francis Peter Alles, Basking Ridge, N.J., assignor to E. I. du Pont de Nemours and Company, Wilmington, Del., a corporation of Delaware
No Drawing. Filed June 19, 1958, Ser. No. 743,011
3 Claims. (Cl. 252—301.4)

This invention relates to an improved process for preparing thallium activated potassium iodide phosphors.

Thallium activated potassium iodide phosphors and several methods for preparing them are known. Phosphors of this type are known to be useful in intensifying screens for X-ray radiation and detecting devices for ionizing radiation.

One prior art method for making thallium activated potassium iodide phosphors is disclosed in British Patent 492,722. This reference discloses evaporating to dryness a water solution of potassium iodide and a thallium salt and calcining at 165° C. In this method, most of the thallium activator will be found in the potassium iodide crystals first formed, and little or no thallium activator will be found in subsequently formed crystals. Therefore, phosphors made by this process are non-uniform and grainy, which in turn produces poor fluorescent characteristics when excited by X-rays or other types of excitation radiation.

In another known method for making such phosphors, potassium iodide and thallous iodide are mixed and ground together in the dry state and then heated. This method is described, for example, in Fonda U.S. 2,727,863, wherein it is also pointed out that about half of the thallous iodide evaporates during the heating step. This, of course, in addition to being uneconomical, makes it extremely difficult or impossible to produce phosphors containing accurately predetermined desired amounts of activator.

I have now discovered a novel process for making a relatively pure, highly efficient, uniform potassium iodide phosphor containing an accurately predetermined amount of thallium as activator. The novel process of my invention comprises heating a mixture of a nearly saturated aqueous solution of potassium iodide and a suitable thallium salt to form a solution, cooling the solution whereby crystalline phosphor particles are formed, and recovering the crystalline phosphor particles. A calcination step is not required.

Suitable thallium salts useful in my invention include thallous nitrate and thallous halide, including thallous fluoride, thallous chloride, thallous bromide and thallous iodide. Alpha, beta and gamma thallous nitrate can be used.

My novel process is based on the discovery that thallous iodide is soluble in a hot saturated solution of potassium iodide. This discovery is surprising and unexpected since it is contrary to information appearing in generally accepted handbook references.

In an exemplary procedure according to this invention, from 1.5 to 15 parts by weight of thallium as a thallous salt per 1,000 parts of potassium iodide are added to a nearly saturated aqueous solution of potassium iodide. This results in the formation of a heavy precipitate of orange colored thallous iodide. Upon heating the mixture, the thallous iodide dissolves and the solution becomes clear and colorless. Upon cooling the solution rapidly, a phosphor crystal forms which, when recovered and dried, fluoresces strongly a bright blue color under excitation by X-ray radiation.

In an alternative embodiment of my invention, the saturated potassium iodide solution can be added into a container holding the desired amount of thallium salt in solution. The potassium iodide solution can be heated prior to admixture with the thallium salt, or after such admixture, or both.

The amount of heating required in the process of this invention will be that sufficient to dissolve the thallous iodide solution. It is obvious that this dissolution temperature may be as high as the point of incipient crystallization of the potassium iodide in the solution.

In the process of my invention, the cooling of the solution is preferably effected more or less rapidly by applying a cooling medium, e.g., cold water, to the exterior of the vessel containing the solution. This conventional method for expediting cooling with concurrent crystallization has been found to be quite satisfactory.

Alternatively, cooling of the solution and crystallization of the uniform phosphor particles can be accomplished effectively by atomizing the solution, thus forming small discrete particles of phosphor that do not increase in size as would occur if the phosphors were crystallized in bulk out of solution. Particle size can be controlled in this manner as desired, and all of the particles will be generally of about the same size.

Another method involves atomizing the hot solution, followed by spray-drying of the atomized droplets to form crystals of uniform size and composition. In this process, a relatively higher concentration of thallous iodide in the heated solution is required to obtain a given concentration in the phosphor crystal because all of the potassium iodide in each droplet is used to form the single crystal.

Recovery of the crystallized phosphors is preferably by filtration, but can be by any other suitable recovery step. During the filtration, the phosphors can be washed if desired with acetone or similar solvent to remove excess water.

The amount of thallium activator can vary over a wide range, as will be understood in the art. From 0.15 to 1.5 parts by weight of thallium per hundred parts of potassium iodide has been found satisfactory.

The thallium activated potassium iodide phosphors made according to this invention are characterized by an emission of bluish colored light upon excitation by X-rays. Because of the uniformity of distribution of the thallium metal activator and the lack of graininess, these phosphors make superior X-ray intensifying screens.

My process is particularly advantageous because it utilizes a reproducibly predetermined amount of ingredients without any wastage during the process.

The invention will be further illustrated but is not intended to be limited by the following examples:

*Example 1*

To a solution of 0.15 gram of thallous nitrate in 30 milliliters of distilled water, there was added a solution of 50 grams of reagent grade potassium iodide in 60 milliliters of water, resulting in a heavy precipitation of orange colored thallous iodide. The mixture was then boiled until the thallous iodide was dissolved and the solution became clear and colorless. The solution was then rapidly cooled by holding its container under a stream of cold water, with resultant crystallization of particles from the solution. The crystals were filtered and washed with acetone to remove the remaining water. The quantity of thallium activated potassium iodide phosphor recovered was 12.4 grams. Boiling the first filtrate liquid to the point of incipient crystallization again and cooling gave crystals which showed substantially no capacity to fluoresce under excitation by radiation, thus indicating that substantially all of the thallium was in the KI crystals first formed.

Example 2

Example 1 was repeated except that, instead of cooling the heated potassium iodide solution by holding the container under cold water, the solution was poured through a capillary tube having a diameter of 1 millimeter and surrounded by cold water. Small crystals of uniform size formed in the tube and were swept through by the flow of the liquid. The crystals were recovered by filtration as in Example 1.

Example 3

The process of Example 1 was repeated and after the recovery of the 12.4 grams of phosphor, 0.113 gram of thallous nitrate was added to the supernatant liquid and the solution was again boiled until the thallous iodide dissolved and the solution became clear and colorless. The solution was again rapidly cooled and 12.4 grams of phosphor crystals were recovered. The process was repeated until substantially all of the potassium iodide was recovered using a proportionate amount of thallous nitrate each time.

The phosphors prepared as in the above examples were used to make intensifying screens having excellent radiographic characteristics. Radiographs exposed with screens made from the thallium activated potassium iodide phosphors prepared according to the present invention exhibit considerably greater detail, greater speed and greater density when compared with those made with screens prepared from conventional phosphors prepared according to prior art processes.

The above examples can be repeated, substituting equal parts of other suitable thallous salts for the thallous nitrate, with similar results. Also, these examples can be repeated using other concentrations of these and equivalent materials, as will be understood by persons in the art in practicing this invention.

In one exemplary procedure for making an intensifying screen using the phosphors prepared according to this invention, the dry phosphor crystals were dispersed in a 20% acetone solution of polyvinyl acetate in a ratio of 10 parts of phosphor to one part by weight of polymer. The resultant dispersion was coated on a support of polyethylene terephthalate 7 mils thick to give a dry coating thickness of 0.006 inch. The phosphor layer was protected from moisture or water absorption by laminating over the phosphor layer a thin (0.0025–0.0005 inch) film of polyethylene terephthalate which had been precoated with polyvinyl acetate. The lamination of the screen was carried out under a pressure of 1500 pounds per square inch at 120° C. for 4 minutes.

The invention claimed is:

1. The process of making thallium activated potassium iodide phosphors which comprises admixing with a saturated aqueous solution of potassium iodide from 1.5 to 15 parts by weight of thallium as a thallium salt from the group consisting of thallous nitrate and thallous halide per 1000 parts of potassium iodide, heating the resultant mixture to dissolve the components, cooling the resultant solution sufficiently to crystallize therefrom phosphor particles, and recovering and drying said phosphor particles.

2. The process as set forth in claim 1 wherein said thallium salt is thallous nitrate.

3. The process of making thallium activated potassium iodide phosphors which comprises admixing with a saturated aqueous solution of potassium iodide from 1.5 to 15 parts by weight of thallium as a thallium salt selected from the group consisting of thallous nitrate and thallous halide per 1000 parts of potassium iodide, heating the resultant mixture to dissolve the components, atomizing said heated mixture to form droplets, and spray-drying said droplets to form phosphor crystals.

References Cited in the file of this patent

UNITED STATES PATENTS

| 2,340,567 | Sargent | Feb. 1, 1944 |
| 2,727,863 | Fonda | Dec. 20, 1955 |

FOREIGN PATENTS

| 492,722 | Great Britain | Sept. 26, 1938 |
| 796,654 | Great Britain | June 18, 1958 |

OTHER REFERENCES

Curran: "Scintillation Counter," pages 114–117, Academic Press, Inc., N.Y., N.Y. (1953).